UNITED STATES PATENT OFFICE.

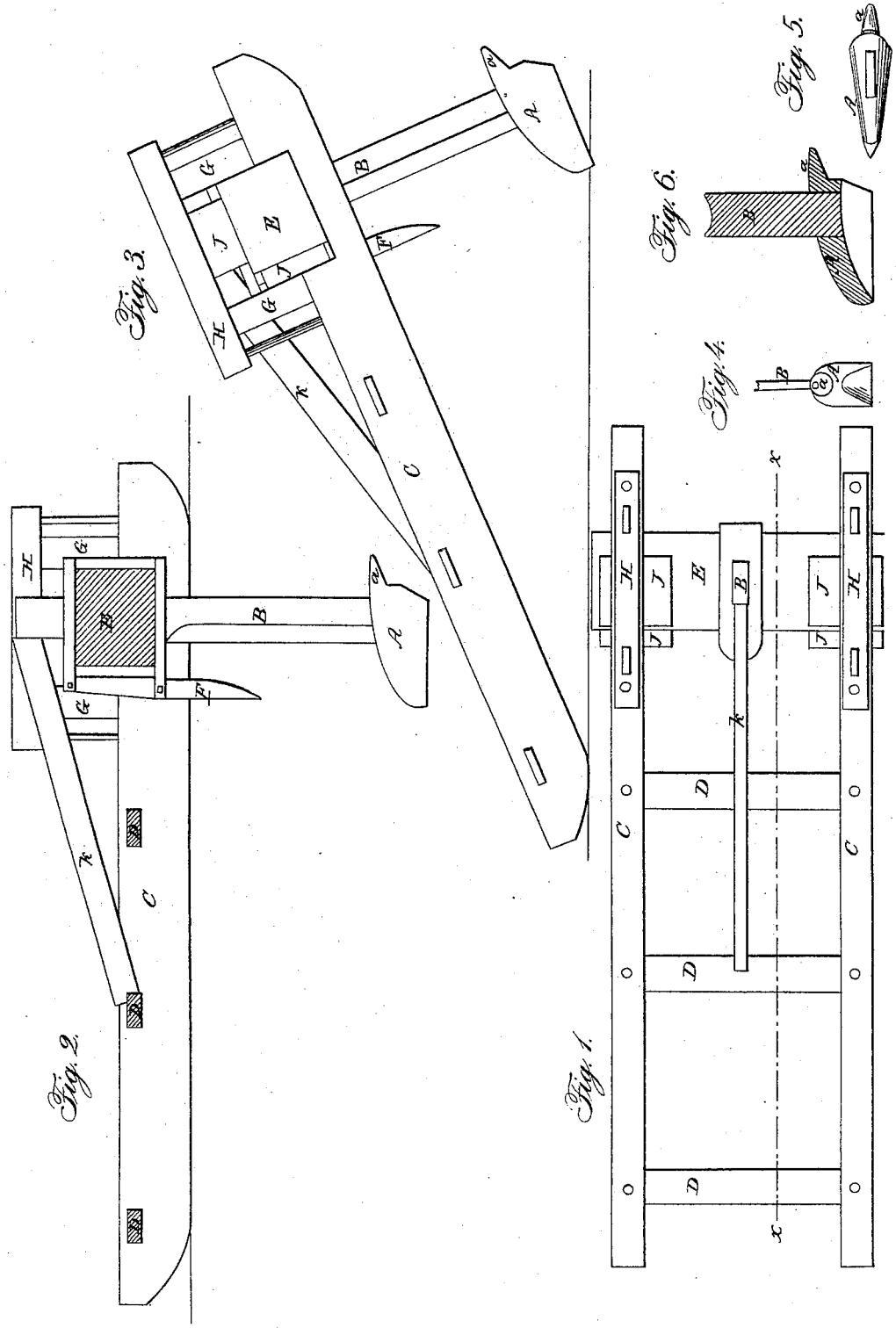

ABRAHAM MARQUISS, EZRA MARQUISS, AND CHARLES MARQUISS, OF MONTICELLO, AND CHARLES EMERSON, OF DECATUR, ILLINOIS.

IMPROVEMENT IN THE MOLE OF DRAINING-PLOWS.

Specification forming part of Letters Patent No. 14,287, dated February 19, 1856.

*To all whom it may concern:*

Be it known that we, ABRAHAM MARQUISS, EZRA MARQUISS, and CHARLES MARQUISS, of Monticello, in the county of Piatt, and CHARLES EMERSON, of Decatur, in the county of Macon, and State of Illinois, have invented sundry new and useful Improvements in the Mole-Plow, or implement for forming subterranean perforations for draining purposes; and we do hereby declare that the following is a full and exact description thereof, reference being had to the accompanying drawings, making a part of this specification—

Figure 1 being a top view of our improved mole-plow; Fig. 2, a vertical longitudinal section in the line $xx$ of Fig. 1; Fig. 3, a side view of said implement placed in a proper position for the application thereto of power to carry its mole into the earth; Fig. 4, a rear view of the mole and a portion of its supporting-shank; Fig. 5, a view of the under side of said mole, and Fig. 6 a vertical longitudinal section of the same.

Similar letters represent corresponding parts in all the figures.

Our first improvement consists in giving such a shape to the mole A that its action upon the earthy substance in forming a perforation will be such as to densely compress the sides and top of said perforation and leave the bottom of said perforation comparatively uncompressed. The dense compression of the top and sides of the perforation formed by our improved mole prevents the water from entering at those parts, and thereby enables them to retain their shape for any length of time, while the uncompressed state of the bottom of said perforation enables the water to enter it freely.

The second feature of our invention consists in the addition of a tail to the said mole of such a shape and placed in such a position that it will serve the purpose of closing up the slit formed by the flat shank B of the mole during its forward movement, and also the additional purpose of guiding and directing the mole to the surface of the earth as soon as the beam E, to which the shank of the mole is secured, is relieved from its fastenings within its supporting-frame, so as to allow said beam to turn freely upon its axis.

The shape of the mole A is clearly represented in Figs. 4, 5, and 6 of the accompanying drawings, viz: It is brought to a sharp cutting edge or point at its forward end, and thence its outer surface flares upward and outward toward the rear until its back terminates in the round tapering tail $a$, which extends some distance beyond the sides of the mole. The under side of the said mole is hollowed out from a point a short distance in the rear of its cutting edge or point back to the rear extremity of its sides, and the rear extremities of said sides of the mole are beveled off to cutting-edges.

The mole A is securely fastened to the lower end of a flat, sharp-edged shank, B, which descends from a strong beam, E, that is secured within a suitable frame in such a manner that it can be rigidly secured in any desired position, or may be allowed to turn freely on its axis.

It will be perceived that the shape of the mole A is such that its forward movement within the earth will cause it to form a perforation whose top and sides will be densely compressed and whose bottom will be left almost entirely uncompressed. The tail $a$ of the mole extends far enough back of the rear edge of the shank B to close up the slit cut by said shank and make a smooth and hard surface at the top of the perforation formed by the mole. As soon as the beam E is relieved from its fastening-wedges, while forward motion is being imparted to the implement, the said pointed tail of the mole, acting in conjunction with the pressure exerted upon the body of the mole, will lead said mole upward to the surface during the forward movement of but a few feet.

It is believed by the undersigned that the sides and top of the perforation formed by our improved form of mole are so densely compressed that the water will not penetrate them and that the said perforation will remain perfect in shape for any length of time. The water being allowed to freely enter the bottom of the perforation made by our improved form of mole, said perforation will serve its purpose much more perfectly than perforations formed by implements of such shape that they act with equal pressure at top, bottom, and sides in forming said perforations.

The frame before referred to is composed of the side pieces or runners, C C, and the cross-pieces D D, which are permanently framed to each other. Pairs of uprights G G rise from the side pieces, C C, of said frame, which have their upper extremities respectively connected to each other by the cap-pieces H H. The yokes thus formed by the uprights G G and their caps H H receive the ends of the strong beam E, to which the colter F and the mole-shank B are rigidly secured by any suitable method of fastening. By means of wedges J J the beam E may be securely confined within the aforesaid yokes, substantially as represented in the drawings, or by any other suitable method that will admit of its being readily fastened and unfastened. When unfastened the said beam E can turn freely in its receiving-yokes. The mole-shank B projects some distance above the beam E, and its front edge is acted upon by the brace k, whose front end bears against the middle cross-piece D of the frame. The ends of the side pieces, C C, of the mole-plow frame are curved or have an upward inclination for the purpose of enabling said frame to pass freely over the surface of the ground.

By placing our improved mole-plow in the position represented in Fig. 3 and causing it to be drawn forward the mole A will immediately bury itself in the earth to as great a depth as the length of its shank will permit, and will maintain that depth as the implement is carried forward.

Perforations may be formed at any desired depth below the surface of the earth with our mole-plow by adjusting the depth of the mole-shank B below the beam E.

We are aware that mole-plows for forming subterranean drains have been used, and therefore we wish it to be understood that we do not claim the principle of forming underground drains by the use of such implements; but What we do claim as our invention, and desire to secure by Letters Patent, is—

1. The peculiar shape of the mole A, which enables its forward movement to form a subterranean perforation whose top and sides will be smoothly and densely compressed and whose bottom will be left almost entirely uncompressed, substantially in the manner and for the purpose herein set forth.

2. Giving the tail a of the mole such a shape and position that it will serve to close up the slit cut by the mole-shank B in forming a perforation, and also serve to lead the mole upward to the surface of the ground as soon as the beam E is allowed to turn on its axis, substantially as herein set forth.

The above machine is intended to underdrain wet land.

Given under our hands this 27th day of December, 1855.

ABRAHAM MARQUISS.
  EZRA MARQUISS.
  CHARLES MARQUISS.
  CHAS. EMERSON.

Attest:
 A. G. BOYER,
 H. C. M. COMAS.